(No Model.)  2 Sheets—Sheet 1.

W. W. JONES.
PLANTER.

No. 456,038. Patented July 14, 1891.

WITNESSES:
Frances McArdle.
C. Sedgwick

INVENTOR:
W. W. Jones
BY Munn & Co.
ATTORNEYS (No Model.) 2 Sheets—Sheet 2.
W. W. JONES.
PLANTER.
No. 456,038. Patented July 14, 1891.
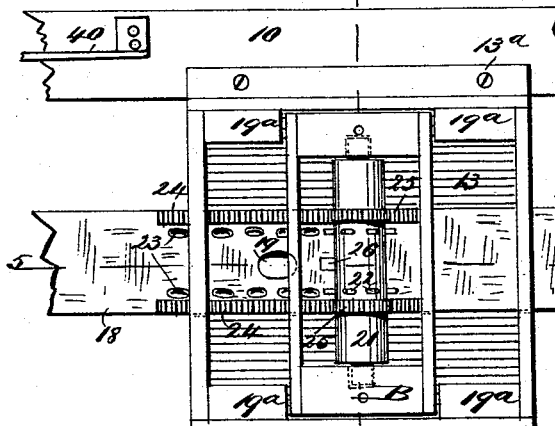
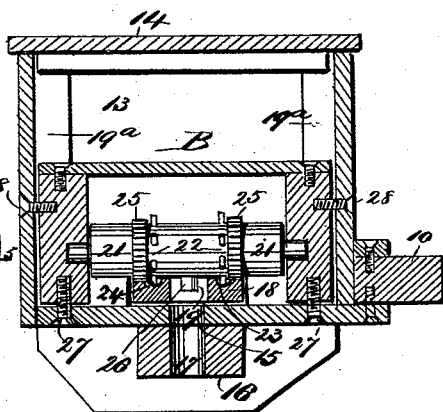
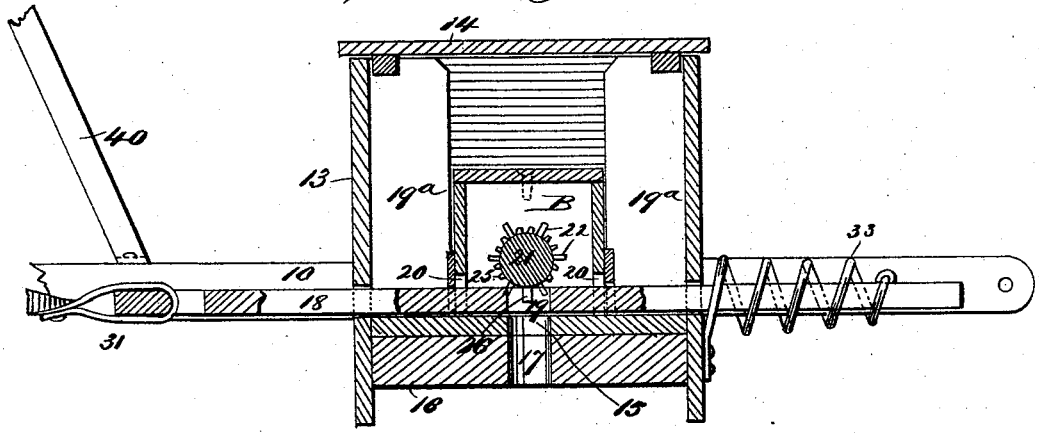
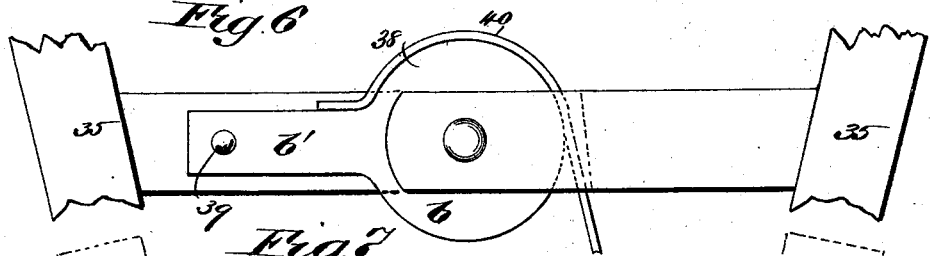
WITNESSES:
F. McArdle
C. Sedgwick
INVENTOR:
W. W. Jones
BY
Munn & Co
ATTORNEYS

UNITED STATES PATENT OFFICE.

WILLIAM W. JONES, OF GRANADA, COLORADO, ASSIGNOR TO HIMSELF AND THADDEUS M. HALL, OF SAME PLACE.

PLANTER.

SPECIFICATION forming part of Letters Patent No. 456,038, dated July 14, 1891.

Application filed October 15, 1890. Serial No. 368,169. (No model.)

*To all whom it may concern:*

Be it known that I, WILLIAM W. JONES, of Granada, in the county of Prowers and State of Colorado, have invented a new and useful Improvement in Planters, of which the following is a full, clear, and exact description.

My invention relates to an improvement in planters, and has for its object to provide an implement of simple, durable, and economic construction which may be conveniently and expeditiously attached to the beam of a plow— a double or a single plow, for example; and a further object of the invention is to provide a seed-box so constructed that any kind of seed may be dropped therefrom without portions of said seed adhering to the drop-slide.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
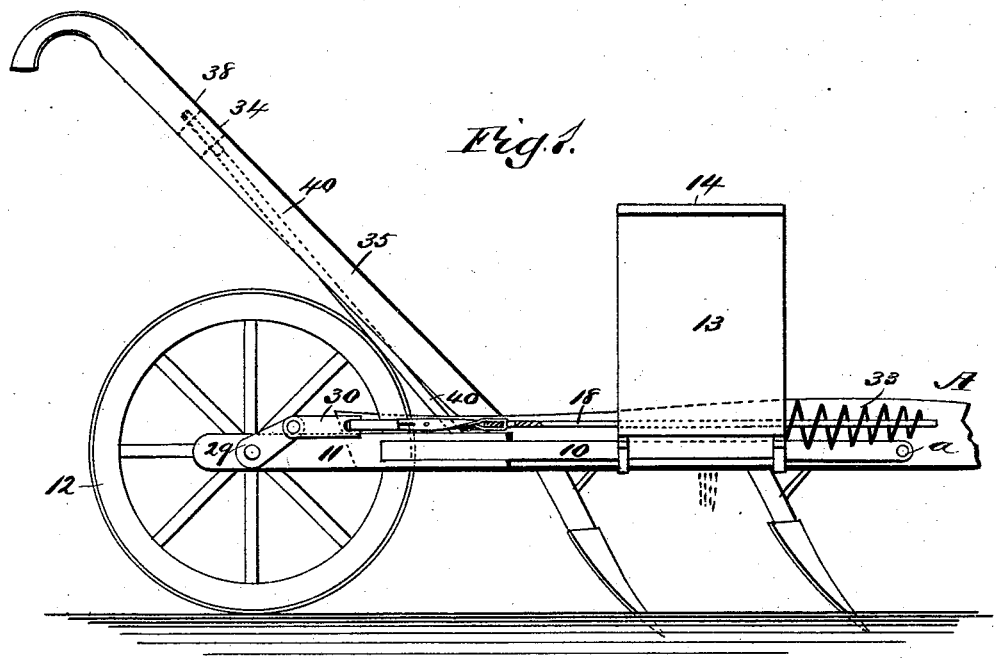
Figure 2:
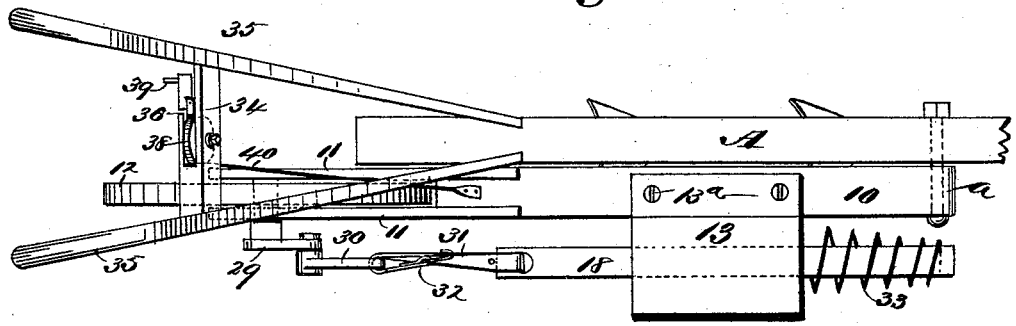

Figure 1 is a side elevation of the device applied to a plow, and Fig. 2 is a plan view thereof. Fig. 3 is a plan view of the seed-box, the covers thereof being removed. Fig. 4 is a vertical section through the box, taken on the line 4 4 of Fig. 3. Fig. 5 is a similar section taken on the line 5 5 of Fig. 3. Fig. 6 is a rear view of the elevating apparatus forming a portion of the invention, the said apparatus being illustrated as attached to the plow-handles, and Fig. 7 is a plan view of the said apparatus.

The body of the device consists of a bar or beam 10 of any desired length, the rear end of which bar or beam has attached to it a bearing 11, in which a supporting-wheel 12 is journaled, the opposite end of the body-beam being pivoted to one side of the plow-beam A, as illustrated at *a* in Figs. 1 and 2.

Upon one side of the body-beam 10 the seed-box 13 is secured, preferably by screws 13ª. This seed-box may be of any approved construction and may be laterally adjustable upon the body-beam; but ordinarily the box is rectangular and extends but a short distance beneath the body-beam 10, the major portion of the box being above the beam.

The box has a detachable cover 14 fitted thereto, and in the bottom of the box at or near the center a drop-opening 15 is produced, which, if desired, may be made to receive a drop-tube. Ordinarily, however, the bottom of the box upon its under side is braced by a cross-bar 16, containing an aperture 17, registering with the drop-opening, as shown in Fig. 5.

The seed-box is further provided with a drop-slide 18. This slide usually consists of a flat beam or bar held to move upon the upper face of the bottom of the box through apertures produced in its sides at the level of the bottom and beneath a housing B, located within the box around the drop-opening. The slide has formed therein, preferably at or near its center, an aperture 19, which aperture is adapted to register with the drop-opening of the box at both the forward and rearward movement of the slide, and when such a registry of the openings takes place a predetermined quantity of seed drops from the box.

The seed-box is provided in the corners at two opposite sides with upright battens 19ª, and between these battens the ends of the housing B are tied. The housing consists of a box-like receptacle open at its bottom and provided with a removable cover and guarded side openings 20, through which the drop-slide passes. A roller 21 is journaled in the ends of the housing transversely over the drop-slide, and at each side of its center the roller is provided with a series of circumferentially-arranged pins 22, adapted to enter depressions or recesses 23, formed in the upper face of the drop-slide, as illustrated in Figs. 3 and 4. Thus a guide is provided for the drop-slide, which compels the opening in the slide to register properly at all times with the drop-opening in the box. A further guide device may be employed, if found desirable, which consists in creating a fluted or rack surface 24 upon the drop-slide at or near each side edge and forming corresponding surfaces 25 upon the roller, which surfaces 25 may be substituted by pinions if in practice it is found desirable. The roller 21 is also provided upon its outer face at the center with one or more studs 26, which studs when the roller revolves enter the drop-opening in the drop-slide and force any seed clinging to the walls of the opening outward through the drop-opening of the box. The housing B may be adjusted upward or downward to cause the roller 21 to contact more or less tightly with the drop-slide by means of screws 27, located in the under face of the box, as illustrated in Fig. 4. When the housing has been properly adjusted, it is firmly held in position by end screws 28.

The axle of the supporting-wheel 12 extends beyond the journal upon that side of the beam to which the seed-box is attached, and the said projecting end of the axle has attached thereto or formed integral therewith a crank-arm 29, and to the said crank-arm a link 30 is pivoted, acting in the capacity of a pitman. The link 30 is connected with the rear end of the drop-slide 18 by a strap 31. One end of the strap 31 is securely attached to the drop-slide and the other is passed through a suitable opening in the link 30. This latter end is provided with a hook 32, adapted to enter any one of a series of apertures produced in the strap. The hook constitutes a take-up, its object being to tighten the strap when occasion may demand.

A spring 33 is coiled around the forward end of the drop-slide, the forward end of which spring is attached to the slide and the rear end to the seed-box. The spring 33 serves to retain the slide in such position that its aperture will register with the drop-opening of the box when the implement is at rest and the supporting-wheel is elevated from the ground.

A cross-bar 34 is secured between the plow-handles 35, as shown in Figs. 6 and 7, and the said cross-bar is provided with an angular recess 36, in which recess the circular end $b$ of a lever 38 is fulcrumed, the said lever comprising the circular section $b$ and a shank-section $b'$, which shank-section is provided with a knob or pin 39.

To the shank-section one end of a strap 40 is secured, which strap passes downward over the peripheral surface of the circular section $b$ of the lever, and the lower end of the strap is attached to the body-beam 10, as illustrated in Figs. 2 and 3. Thus the entire device may be thrown out of action at any time by pressing down upon the knob 39 of the lever 38, which action causes the rear end of the attachment to be sufficiently elevated to remove the drive-wheel from the ground. The drive-wheel is of suitable diameter to admit of the mechanism connecting it with the seed-box being sufficiently elevated above the ground to be entirely free from any impediments or obstructions.

In operation, when the wheel 12 is in engagement with the ground, as said wheel revolves the drop-slide is drawn forward and rearward alternately, and upon each movement of the drop-slide a certain quantity of seed contained in the box around the housing B is caused to drop to the ground through the drop-opening of the box, and all of the seed carried to the opening by the slide is compelled to fall by reason of the studs 26 of the roller 22 entering the aperture of the slide and forcing the seed therefrom. The drop-slide is compelled to move at all times in the same path by reason of the connection between it and the roller 21.

If in practice it is found desirable, any form of fender may be detachably secured to the plow-beam in front of the plow to clear trash therefrom.

Having thus described my invention, I claim as new and desire to secure by Letters Patent—

1. In an implement of the character described, the combination, with a plow-beam, an auxiliary beam pivoted thereto at one end, and a drive-wheel located at the opposite end, of a spring-pressed slide located in the box and a flexible connection between the drop-slide and the axle of the drive-wheel, as and for the purpose specified.

2. In an implement of the character described, the combination, with a plow-beam, an auxiliary beam pivoted thereto at one end, and a drive-wheel located at the opposite end, of a spring-pressed slide located in the box, a flexible connection between the drop-slide and the axle of the drive-wheel, a lever adapted for attachment with the plow, and a connection between the said lever and the pivoted beam, as and for the purpose specified.

3. In an implement of the character described, the combination, with a drive-shaft provided with a crank-arm, a drive-wheel carried by the said shaft, and a seed-box, of a spring-pressed drop-slide, a roller journaled in the box having a spur connection with the slide, and a flexible connection between the drop-slide and the crank-arm of the drive-shaft, the said flexible connection being provided with a take-up device, as and for the purpose set forth.

4. In an implement of the character described, the combination, with a seed-box having a drop-opening near the center of its bottom, of a drop-slide provided with a central opening and held to laterally reciprocate in the seed-box, and a guide-roller journaled in the box and having a spur connection with the drop-slide, substantially as and for the purpose specified.

5. In an implement of the character described, the combination, with a seed-box having a drop-opening therein near the center of its bottom and a housing located in the box over the drop-opening, of a drop-slide held to laterally reciprocate in the box over the drop-opening and below the housing, and a roller journaled in the housing, having a spur connection with the drop-slide and provided with a finger adapted to enter the said opening of the drop-slide, as and for the purpose set forth.

6. In an implement of the character described, the combination, with a plow-beam, an auxiliary beam pivoted at one end to the side of the plow-beam, a shaft journaled in the opposite end of the auxiliary beam, and a supporting-wheel secured upon said shaft, of a seed-box attached to the auxiliary beam, a spring-controlled drop-slide held to reciprocate in the seed-box, a flexible connection between the drop-slide and the shaft, a lift-lever adapted for attachment to the plow, and a connection between the lift-lever and the auxiliary beam, as and for the purpose specified.

WILLIAM W. JONES.

Witnesses:
W. A. MERRILL,
J. C. MERRILL.